United States Patent [19]

Kenmochi

[11] Patent Number: 5,128,842
[45] Date of Patent: Jul. 7, 1992

[54] UNIFORM ILLUMINATION PLATE

[75] Inventor: Yoshio Kenmochi, Ichihara, Japan

[73] Assignee: Sunarrow Co., Inc., Tokyo, Japan

[21] Appl. No.: 709,488

[22] Filed: Jun. 3, 1991

[51] Int. Cl.$^5$ ............................................. F21V 33/00
[52] U.S. Cl. ........................................ 362/95; 362/31; 362/27; 200/314; 200/DIG. 47
[58] Field of Search ...................... 362/31, 26, 27, 29, 362/30, 95; 200/313, 314, DIG. 47

[56] References Cited

U.S. PATENT DOCUMENTS

| | | | |
|---|---|---|---|
| 3,752,974 | 8/1973 | Baker et al. | 362/31 |
| 4,247,747 | 1/1981 | Swatten | 200/314 |
| 4,349,705 | 9/1982 | Kuhfus | 200/314 |
| 4,822,145 | 4/1989 | Staelin | 362/31 |
| 4,890,201 | 12/1989 | Toft | 362/31 |
| 4,914,553 | 4/1990 | Hamada et al. | 362/32 |

FOREIGN PATENT DOCUMENTS 834837 11/1950 Fed. Rep. of Germany ........ 362/31
58-82732 6/1983 Japan .

Primary Examiner—Ira S. Lazarus
Assistant Examiner—L. Heyman
Attorney, Agent, or Firm—Hedman, Gibson & Costigan

[57] ABSTRACT

A laniform illumination plate comprising light emitters at one side thereof to irradiate the display section of the necessary keys with uniform illumination, a light-transmitting thin plate which has total reflection inside the plate thickness, the light emitters located in predetermined intervals, with sloped or curved concave reflecting sections formed on the bottom surface of the thin plate corresponding to the location of the keys, or strip shaped concave reflecting sections which run across the width of the thin plate, whereby the light is directed to the corresponding keys on the top surface of the thin plate.

7 Claims, 2 Drawing Sheets

UNIFORM ILLUMINATION PLATE

FIELD OF THE INVENTION

This invention relates to a light concentrator incorporated in illuminated switches used e.g. in the terminal keys for all types of movable communication devices such as mobile telephones or in the terminal keys for all kinds of information processing devices.

BACKGROUND OF THE INVENTION

In prior art illuminated key-tops, a light emitting body such as an LED is located behind the display section of each key with characters or symbols on the surface of the key-top.

Also, for thin illuminated keyboard switches, a light guide is provided inside the switch casing such that a reflective surface is located on the bottom surface to reflect light upwards. The light guide made of transparent synthetic resin is arranged with the top surface of the light guide being flat and smooth. The bottom surface of the light guide has a curved surface with the center curving upward. In the curved surface of this sphere or concave are formed concentric small protruding sections. On the top surface of the light guide is a flexible printed board on the stationary side, an insulating film with openings, and a flexible printed board on the movable side, layered in that order. Also on the side of the light guide is an illuminating lamp (see Japanese Utility Model First Publication No. 58-82732).

For devices that have light emitting elements such as a LED behind the display section of each key with a character or symbol on the key-top, the light emitting elements must be prepared and installed for each key-top. Accordingly, the installation work is very troublesome and the light emitting elements themselves are expensive, and thus high cost of the whole device can not be avoided.

There is also a prior art device having a light guide having a flat and smooth top surface and an underneath surface which curves upward in the center with small concentric protruding sections on the curved surface and an illuminating lamp on the side of the light guide, which is constructed such that the top surface of the light guide is generally shone uniformly, which is different from the device where light is shone on only the display section of the corresponding keys. Since the entire top surface of the light guide is generally shone uniformly, the irradiation efficiency is poor. Also the entire underneath surface of the light guide is curved and so it is necessary in its construction to arrange illuminating lamps all around the light guide, causing a problem that the number of illuminating lamps increases.

The object of this invention is to provide a light concentrator which makes it possible to locate a light emitter on only one side of the apparatus while at the same time being able to uniformly illuminate only the display section of the necessary keys.

SUMMARY OF THE INVENTION

The uniform illuminating apparatus of this invention is comprised of a thin light-transmitting plate and emitters which are located at a predetermined distance at one end of the thin light-transmitting plate which has total reflection inside the plate thickness. The upper or top surface of the thin plate has a plurality of keys. Formed on the bottom surface of the thin plate in a locations corresponding to the locations of each key are slanted or curved reflecting concave sections, or reflecting concave sections in the shape of strips running in a direction of the width, which concentrates the irradiated light to the top surface of the thin plate from the bulk side thereof.

In another invention, the reflecting concave sections which are formed on the underneath surface of the thin plate are made so that the slope angles and/or the depths of the concave sections are changed according to the distance away from the light emitter.

Also, in order to concentrate the irradiated light onto the top surface of the thin plate from the bulk side thereof, the light is reflected from the reflecting concave sections and collected to key-tops of light diffusing material supported integrally or separately by a skirt section, which is provided on top of a sheet with a stationary contact, located on top of the thin plate, so as to perform a click movement.

Furthermore, a film of non-light-transmitting coating with a low refractive index is formed on the remaining top surface of the thin plate except for the locations on the thin plate corresponding to the keys. In addition, a film of non-light-transmitting coating is provided generally on the bottom surface of the thin plate.

Also, the thin light-transmitting plate which performs total reflection inside the plate thickness is made from resins with a high refractive index such as methacrylate resin, polycarbonate, and ABS resin, glass or light-transmitting rubber.

Also the light-transmitting plate has a highly reflective film on the back surface of the concave reflecting sections formed on the underneath surface of the thin light-transmitting plate which has total reflection inside the plate thickness.

Furthermore, a highly reflective film is formed generally on the side edges of the thin light-transmitting plate which has total reflection inside the plate thickness.

DETAILED DESCRIPTION OF THE PREFERRED EMBODIMENTS

Figure 1:
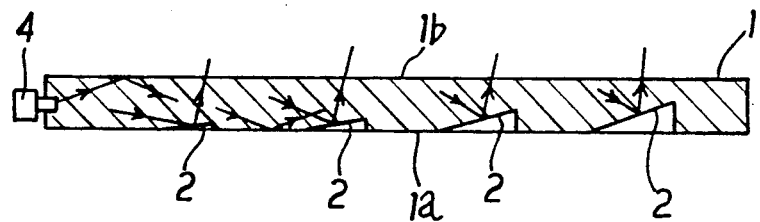
FIG. 1 is a cross-sectional view of an embodiment of the light-transmitting plate of this invention.

The uniform illuminating plate is comprised of a light-transmitting thin plate 1 and light emitters 4. The transmitting plate 1 has a top and bottom surface with space in between the surfaces. The top surface 1b of the plate 1 has a plurality of keys 3. Formed on the bottom surface 1a of the plate 1 in locations which correspond to the location of the keys are inclined, concave or curved reflecting sections 2.

Light radiates from light emitters 4 which are located at one side of the light-transmitting thin plate 1 at predetermined distances. The transmitting plate 1 is completely enclosed enabling the light to reflect repeatedly between the top 1b and bottom 1a surfaces on the plate. The concave reflecting sections 2 on the bottom surface 1a of the plate 1, reflect and concentrate the radiated light onto the top surface 1b of the plate 1. On the top surface 1b of the thin plate 1 except for the locations corresponding to the keys 3, the light experiences total reflection so that no light goes through outside. Also, in the case of a strip shaped concave reflecting section, only the group of keys and the spaces in between them for each corresponding row of keys is irradiated and so there is little light loss and effective irradiation is possible. Therefore, light can be sen to may keys 3 using only a few light emitters 4.

Accordingly, it is possible to make the illuminated keyboard thinner, and more portable and convenient.

As each concave reflecting section 2 gets further away from the light emitter 4, it is possible to keep illumination at each location corresponding to the keys 4 uniform by increasing the slope angle and/or the depth of the concave sections 2, or by increasing the slope angle along with increasing the depth of the concave sections.

Also, after concentrating the light on the top surface 1b of the thin plate 1 from the bulk side, the collected light enters into the key-top 5, and is uniformly diffused inside &he key-top 5.

Only, the specified place in the key-top 5 that needs to be irradiated becomes bright while the rest stays dark. Thus, the key top 5 is uniformly irradiated and the display characters and symbols are easy to see.

The light-transmitting thin plate 1 is made of a light-transmitting rubber material to provide total reflection and to conveniently fit onto a curved key board.

Also, if a non-light-transmitting coated film with a low refractive index is formed on the top surface 1 b of the thin plate 1 except in the places corresponding &o the keys 3, and also formed on the bottom surface 1a of the thin plate 1 improving, the total reflection efficiency inside the thin plate 1 decreasing with the light escaping to the outside being decreased, and the light energy from the light emitters 4 effectively irradiates the corresponding keys 3.

Furthermore, if a highly reflective film is formed on the back of the concave reflecting sections 2 on the bottom surface 1a of the light-transmitting thin plate 1 which has total reflection inside the plate thickness, the reflection efficiency of the concave reflecting sections 2 is increased and it is possible to send brighter light to the top surface 1b of the thin plate 1 from the bulk side.

Also, if a highly reflective film is formed on the side edges 14 of the light-transmitting thin plate 1 which has total reflection inside the plate thickness, the light is effectively reflected to the interior of the thin plate 1 by the reflective film on the side edges 14, and light is not leaked to the outside making it possible to send even brighter light to the top surface 1b of the thin plate 1 from the bulk side.

An embodiment of this invention will now be explained based on the drawings.

A thin plate 1 of light transmitting material is made a few millimeters thick to reflect totally inside the plate thickness. The thin plate 1 is made out of totally reflective materials such as methacrylate resin, polycarbonate, and ABS resin, which are resins that have a high refractive index, glass or light-transmitting rubber. If the thin plate 1 is made of light-transmitting rubber, it can be fitted with a curved key board and is very convenient.

The sloped or curved concave reflecting sections 2 are provided on the bottom surface 1a of the thin plate 1 corresponding to the locations of the keys 3. In this illustrarted embodiment, sloped concave reflecting sections are shown. The projected planar shape of the concave reflecting sections 2 can be square, rectangular, circular, or elliptical, and the concave section can also be referred to as the depressed section, the indented section or the grooved section.

Figure 2:
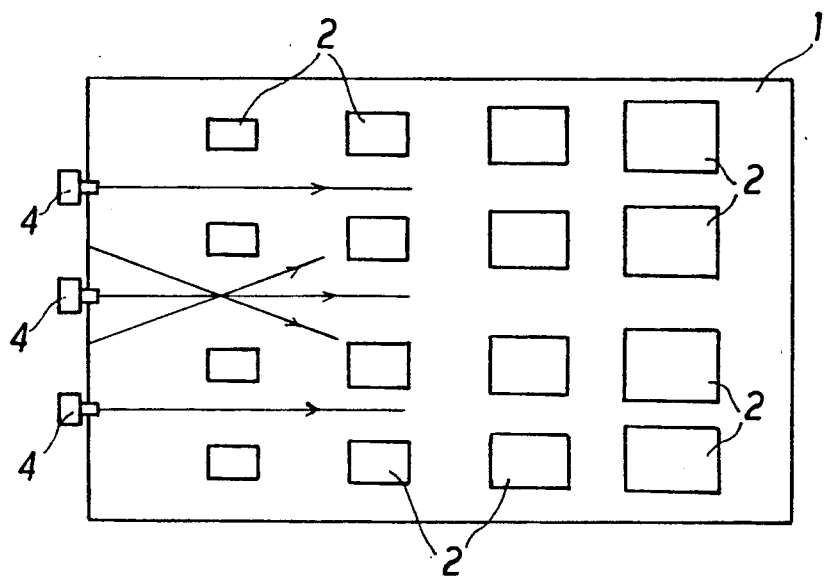
FIG. 2 is a plan view of the bottom surface of the light-transmitting plate.

Light emitting diodes (LED) 4 for the light source for the light concentrator are located at one side end or edge 14 of the thin plate 1 With a predetermined distance betweeen them. The concave reflecting sections 2 formed on the bottom surface 1a of the thin plate 1 are made so that the slope and/or the depth of the concave section is changed depending on the distance away from the light emitters 4 and the area of the reflecting concave reflecting section 2 is progressively enlarged as the reflecting concave reflecting sections 2 are further away from the light emitter 4 as shown in FIG. 2. Specifically, as the concave reflecting sections 2 get further away from the light emitters 4, the slope angle is progressively increased or the depth of the concave is progressively increased. Also, both the slope angle and the depth can be progressively increased as they get further away from the light emitters 4. By changing the slope angle and the depth of the concave section, the light can be sent further, and by forming the reflecting concave sections 2 so that the area of the reflecting concave section 2 is progressively enlarged as the reflecting concave section 52 is further away from the light emitter 4 the illumination of each key-top 5 which needs light for the characters and symbols on the keys 3, is uniform no matter where the key-top 5 is located.

Figure 3:
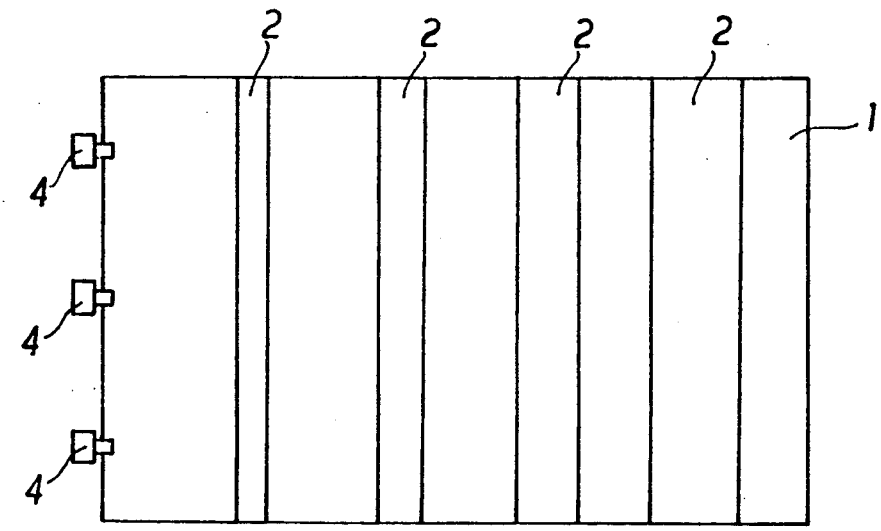
FIG. 3 is a plan view of the bottom surface of a light-transmitting plate of another embodiment.

It is not necessary to form one concave reflecting section 2 for each corresponding key, it is also possible to form a strip shaped concave reflecting section 2, which as shown in FIG. 3, runs under a row of keys perpendicular to the length of the thin plate 1 in the direction of the width. For the strip shaped concave reflecting section 2, light shines only on the group of keys 3 and the spaces between the keys 3 corresponding to each row, therefore the light lost is low and the keys 3 can be effectively irradiated. Whether the concave reflecting sections 2 on the bottom surface 1a of the thin plate 1 is a sloped or concave section corresponding to the location of each key 3 or whether it is a strip shaped concave reflecting section 2 running across the width of the thin plate 1, light can be sent from a few light emitters 4 to many key-tops 5 which need light for the characters and symbols on &he keys 3.

Figure 5:
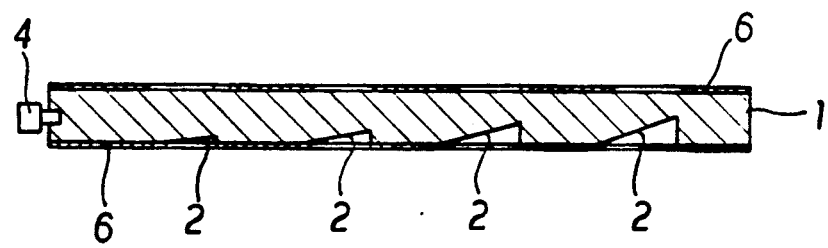
FIG. 5 is a cross-sectional view of the non-light-transmitting coated film which has a very low refractive index, formed on the top surface of the light-transmitting plate everywhere except in the locations that correspond to where the keys are.

Also, incidence and reflection in total reflection occur repeatedly inside the thickness of the thin plate 1, so that light loss is kept to a minimum as much as possible. In order to prevent radiation of light from the top surface 1b of the thin plate 1 where illumination is not required, it is possible to form a non light-transmitting coating film 6 with a low refractive index on the top surface 1b of the thin plate 1 everywhere except in the locations corresponding to the keys 3, as shown in FIG. 5.

Figure 4:
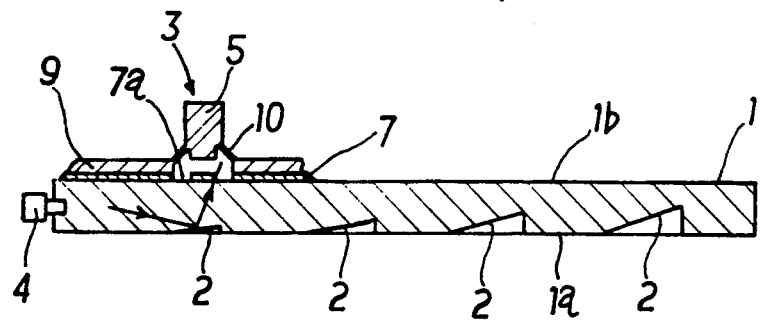
FIG. 4 is a cross-sectional view of a key-top made from light diffusing material located on the top surface of the light-transmitting plate of another embodiment.

Also, as shown in FIG. 4, there is a stationary contact 8 on the top surface 1b of the thin plate 1, and around the stationary contact 8 is a sheet 7 with a through-hole 7a through which light passes. provided on top of this sheet 7 is a rubber sheet 9 with a skirt section 10, which performs the clicking movement and supports the key-top 5 which is made of light diffusing material such as resin. Since the key-top 5 is made of a light diffusing material, the reflected light from the concave reflecting section 2 of the thin plate 1 is concentrated on the top of surface 1b of the thin plate 1 in the location of each key 3, and the collected light enters into the key-top 5 supported by the skirt 10 whereby the light flux, even if unevenly entering into the bottom surface of the key-top 5, is uniformly diffused inside the key-top 5 and the characters and symbols that need to be irradiated are uniformly irradiated and are easy to see.

Figure 6:
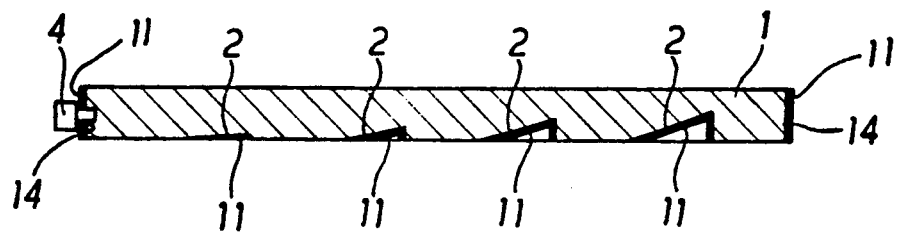
FIG. 6 is a cross-sectional view showing the reflective film formed on the back of the concave reflecting sections of the light-transmitting plate.

Furthermore, as shown in FIG. 6, it is possible to apply a highly reflective film 11 made of e.g. silver by evaporation or by adhesion to the back of the concave reflecting sections 2 on the bottom of the light-transmitting thin plate with total reflection inside the plate thickness.

Also, not shown in any of the drawings, but if a highly reflective film is formed on the side edges 14 of the light-transmitting thin plate 1 with total reflection inside the plate thickness (for the rectangular thin plate 1 of these embodiments, at least the three side edges with no light emitter attached), the light inside the thin plate 1 is more efficiently reflected by the highly reflective film on the side edges 14 and substantially no light leaks to the outside, making it possible to send even brighter light to each of the keys 3.

In the light-transmitting plate 1 of this invention, by locating a few light emitters 4 on only one side edge 14 of the light concentrator it ia possible to irradiate many key-tops 5 which display the characters any symbols on the keys. Also, because of the concave reflecting sections 2 formed on the bottom surface 1a of the thin plate 1, whether the concave reflecting sections 2 are sloped or concave sections, the light which has been totally reflected over and over again inside the plate thickness is reflected by the concave reflecting sections 2 and concentrated on the top surface 1b of the thin plate 1 from the bulk side thereof, and the keys 3 can be effectively irradiated with very low loss of light energy because the remaining top surface 1b of the thin plate 1 does not allow to radiate light to the outside.

Furthermore, as each of the concave reflecting sections 2 gets further away from the light emitters 4, the slope angle or the depth of the concave section 2 is progressively increased or both the slope angle and the depth of the concave section is progressively increased, and by changing the slope angle and the depth of the concave sections and by forming the reflecting concave sections 2 so that the area of the reflecting concave section 2 is progressively enlarged as the reflecting concave sections 2 are further away from the light emitter 4, the light inside the thin plate can be sent further and illumination of the key-tops 5, which need light for the characters and symbols on the keys, is uniform no matter where the key-top 5 is located.

Also, a sheet 7 having a stationary contact 8 is located on the top surface 1b of the thin plate 1, and on top of this sheet 7 are the key-tops 5, made of light diffusing material, supported either integrally or separately by a skirt 10 which performs the click movement. When light is reflected from the concave reflecting sections 2 of the thin plate 1 and collected on the top surface 1b in the location of the corresponding keys 3 and enters the key-tops 5 which are supported by the skirt 10, the light flux, even if entering unevenly into a portion of the bottom surface of the key-top 5, is uniformly diffused inside the key-top 5 and the characters and symbols that need to be irradiated are uniformly irradiated and are easy to see.

Also, because there is a non-light-transmitting coating with a lot refractive index formed on the top surface 1b of the thin plate 1 everywhere except where the keys 3 are located, and a non-light-transmitting coating 6 provided generally on the bottom surface 1b of the thin plate 1, light loss due to light being radiated to the outside while the light is repeatedly being reflected inside the thin plate can be prevented. Furthermore, if the thin plate 1 is made of a light-transmitting rubber, it can be used with a curved keyboard making it even more convenient.

Moreover, if a highly reflective film 11 is formed on the back of the concave reflecting sections on the bottom surface 1a of the light-transmitting thin plate 1 which has total reflection inside the plate thickness, the reflection by the concave reflecting sections 2 becomes even more efficient, and brighter light can be sent to each of the keys 3.

Also, if a highly reflective film 11 is formed on the side edges 14 of the light-transmitting thin plate 1 which has total reflection inside the plate thickness, the light is more efficiently reflected inside the thin plate 1 due to the reflective film 11 on the side edges 14, so that light does not leak to the outside making it possible to send brighter light to each of the keys.

I claim:

1. An apparatus for illuminating a plurality of keys comprising:
    (a) a light-transmitting thin plate, having upper and lower substantially parallel and planar surfaces and side surfaces in between which total reflection occurs and a plurality of keys positioned in discrete locations on said upper surface and a plurality of discrete sloped reflecting sections which correspond to said plurality of keys said sloped reflecting surfaces being recessed from the lower surface such that there is a discrete recessed sloped reflecting surface below each of said keys;
    (b) a plurality of light emitters located on one of said side surfaces of said thin plate to introduce light between said upper and said lower surfaces, the plurality of keys being positioned above said plurality of sloped reflecting sections so that the light reflected at said sloped reflecting sections is directed to said plurality of keys which corresponds to said sloped reflecting sections, respectively; and
    (c) the size of said sloped reflecting sections being progressively larger with greater distance from the light emitter so that said plurality of keys are substantially uniformly illuminated.

2. An apparatus according to claim 1, wherein a non-light-transmitting film with a low refractive index is formed generally on the top surface of the thin plate except in places at least corresponding to the locations of the keys, and generally on the bottom surface of the thin plate.

3. An apparatus according to claim 1, wherein the light-transmitting thin plate which has total reflection inside the plate thickness is made out of a member selected from the group of resin having a high refractive index, glass and light transmitting rubber.

4. An apparatus according to claim 3, wherein the resin is selected from the group of methacrylate resin, polycarbonate resin and ABS resin.

5. A light concentrator according to claim 1, further having a highly reflective film formed on the back of the concave reflecting sections on the bottom surface of the light-transmitting thin plate which has total reflection inside the plate thickness.

6. A light concentrator according to claim 1, further having a highly reflective film formed on the side edges of the light-transmitting thin plate which has total reflection inside the plate thickness.

7. An apparatus according to claim 1, wherein the sloped reflecting section has a flat sloped surface.

* * * * *